United States Patent [19]

Kempter et al.

[11] Patent Number: 5,576,386
[45] Date of Patent: Nov. 19, 1996

[54] CONTINUOUS POLYMERIZATION OF VINYL MONOMERS

[75] Inventors: Fritz E. Kempter, Mannheim; Manfred Niessner, Schifferstadt; Ralph Diener, St. Martin; Heino Thiele, Ludwigshafen; Wolfram Weiss, Mutterstadt; Hans Renz, Meckenheim, all of Germany

[73] Assignee: BASF Aktiengesellschaft, Ludwigshafen, Germany

[21] Appl. No.: 10,060

[22] Filed: Jan. 28, 1993

[30] Foreign Application Priority Data

Feb. 6, 1992 [DE] Germany .................. 42 03 277.6
Feb. 6, 1992 [DE] Germany .................. 42 03 278.4

[51] Int. Cl.$^6$ .................................................. C08F 2/02
[52] U.S. Cl. .................. 526/88; 526/328; 526/347.2
[58] Field of Search .............. 526/88, 328, 347.2; 422/135, 192, 218, 224; 366/157.1, 173.1, 178.1, 178.2, 178.3

[56] References Cited

U.S. PATENT DOCUMENTS

| | | | |
|---|---|---|---|
| 2,996,287 | 8/1961 | Audran | 422/224 |
| 3,424,733 | 1/1969 | Pollock | 422/135 |
| 3,466,269 | 9/1969 | Fivel | 526/88 |
| 3,744,763 | 7/1973 | Schnoring et al. | 366/178.1 |
| 3,790,547 | 2/1974 | Muller | 526/88 |
| 4,355,142 | 10/1982 | Khungar et al. | 526/88 |
| 4,416,548 | 11/1983 | Carre et al. | 366/178.1 |
| 4,487,897 | 12/1984 | Matsuoka et al. | 526/88 |
| 4,612,355 | 9/1986 | Belz | 526/88 |
| 4,695,608 | 9/1987 | Engler et al. | 526/88 |
| 5,470,539 | 11/1995 | Imamura et al. | 422/224 |

FOREIGN PATENT DOCUMENTS

| | | |
|---|---|---|
| 0068024 | 1/1983 | European Pat. Off. |
| 0096901 | 12/1983 | European Pat. Off. |
| 0156170 | 10/1985 | European Pat. Off. |
| 1545077 | 8/1969 | Germany. |
| 1905919 | 9/1969 | Germany. |
| 2140081 | 2/1972 | Germany. |
| 2728459 | 1/1979 | Germany. |
| 3026831 | 2/1982 | Germany. |
| 3034171 | 5/1982 | Germany. |
| 715666 | 9/1954 | United Kingdom. |
| 1092844 | 11/1967 | United Kingdom. |

OTHER PUBLICATIONS

Kirk–Othmer Encyclopedia of Chemical Technology, 3rd ed., vol. 1, 1978, H. F. Mark, et al., "Acrylic Ester Polymers", pp. 386–408.

*Primary Examiner*—Thomas R. Weber
*Attorney, Agent, or Firm*—Oblon, Spivak, McClelland, Maier & Neustadt, P.C.

[57] ABSTRACT

A process for the continuous polymerization of vinyl monomers to form vinyl polymers having a molecular weight $M_n$ of from 1000 to 20,000 comprises a. carrying out the polymerization within an annular gap from 0.5 to 10 mm in width, b. confining the annular gap on the inner surface with a rotor, and c. carrying out the polymerization at from 110° to 270° C.

18 Claims, No Drawings

CONTINUOUS POLYMERIZATION OF VINYL MONOMERS

The present invention relates to a continuous process for the polymerization of vinyl monomers to form vinyl polymers having an average molecular weight Mn of from 1000 to 20,000.

Processes for the continuous polymerization of vinyl monomers of low molecular weight at high temperatures are known.

These processes are essentially continuous kettle processes which are carried out in bulk or with small amounts of solvent.

The products are used for producing paints, paper coatings, printing inks, adhesives, floor care agents and auxiliaries.

DE-A-3 034 171 discloses preparing copolymers from aromatic monoolefins and carboxyl-containing monomers to an average molecular weight of from 500 to 5000 at from 200° to 400° C. in the absence of initiators. The reactor used is a pressure kettle with a downstream pressure pipe.

DE-A-2 728 459 discloses acrylate resins having a molecular weight $M_n$, between 1500 and 3000 and a polydispersity value $M_w/M_n$ between 1.5 and 2.0. The polymerization is carried out in a stirred kettle with a downstream static mixer.

DE-A-2 502 172 describes a process for preparing low molecular weight copolymers for use as paper sizing agents that is likewise carried out in a pressure kettle with a downstream pressure pipe.

To avoid caking to the reactor walls, DE-A-3 026 831 recommends periodic pressure variations in the above-described reactor combination.

EP-B-68 024, EP-96 901 and EP 156 170 likewise disclose processes for free radical polymerizations at high temperatures in a stirred kettle. The copolymers have a low molecular weight and a narrow molecular weight distribution.

The prior art continuous polymerization processes for preparing polymers having a low molecular weight and a narrow molecular Weight distribution are all carried out in stirred kettles.

However, there are a number of difficulties associated with polymerization in a stirred kettle, in particular the problem of removing from the usually exothermic polymerization reaction, in particular in the case of acrylic monomers, the large quantities of heat liberated at high temperatures in the course of short reaction times while trying to maintain as isothermal a temperature control as possible.

Furthermore, the reaction times in the reactor should be as short as possible and the space-time yields as high as possible.

Short reaction times and hence short residence times, for example of from 2 to 4 minutes, are difficult to achieve in stirred kettles, since a considerable amount of time is required just for mixing the monomer feed with the kettle contents.

At below 180° C. the mixing times increase appreciably, inter alia for viscosity reasons. EP 156 170 and EP 96 901 accordingly specify 180° C. as lower limit for the reaction temperature in the stirred kettle.

It has hitherto hardly been possible to maintain extremely short reaction times of about 1–2 minutes for the temperature range above 180° C. and about 4–10 minutes for the temperature range below 180° C., nor consequently to achieve particularly favorable space-time yields, in particular for monomer mixtures with a high acrylic ester content.

With respect to the preparation of thermally sensitive vinyl polymers having functional groups it would be generally desirable to have a polymerization process for vinyl polymers of low molecular weight that could be carried out at below 180° C.

Furthermore, shorter residence times in the reactor can reduce the discoloration of the products. In particular in the case of thermally sensitive monomers having functional groups, for example hydroxyl or epoxy groups, shorter residence times can eliminate discoloration and premature crosslinking.

It is an object of the present invention to provide a continuous process for preparing vinyl polymers of low molecular weight at high temperatures that makes possible short residence times and high space-time yields under almost isothermal conditions.

We have found that this object is achieved by a process for the continuous polymerization of vinyl monomers to form vinyl polymers having a molecular weight Mn of from 1000 to 20,000, which comprises a. carrying out the polymerization within an annular gap from 0.5 to 10 mm in width,
b. confining the annular gap on the inner surface with rotor, and
c. carrying out the polymerization at from 110° to 270° C.

Reactors for the polymerization process of the invention can also be referred to as annular gap reactors. The annular gap is realized by equipping a tubular reactor with a rotor. Such annular gap reactors are known in principle and are available for example from Buss SMS GmbH Verfahrenstechnik, D-6308 Butzbach.

The reaction space, ie. the capacity of the annular gap, is essentially also determined by the circumference of the annular gap and its length. The dimensions can be for example such as to produce a reaction space of from 100 ml to 10 l. Reactors in production plants can be appreciably larger still.

The rotor suitably has a circular cross-section. The rotor is in particular a cylindrical insert into the tubular reactor, the length of which advantageously corresponds to that of the outer tube.

The jacket and optionally the rotor of the annular gap reactor are temperature controllable, ie. equipped for external and optionally internal cooling.

The combination of a temperature controllable rotor with the small gap width achieves approximately a doubling of the heat transfer area. Since in this case twice the amount of heat can be removed, it is possible to double the throughput.

The circumferential speed of the rotor is preferably 0.5–2 m/s, particularly preferably 1–1.5 m/s.

The rotor may be equipped with attachments which improve mixing in the radial direction to improve the heat transfer from the reaction space to the wall; the rotor can also be equipped with helical webs, in which case it can also act as an axial screw conveyor. The mixer attachments do not touch the reactor wall.

The confining of the gap width to the range from 0.5 to 10 mm, particularly preferably from 0.5 to 7.0 mm, particularly preferably from 1 to 5 mm, is an important precondition for the isothermal characteristics of the desired polymerization reaction.

The ratio Of heat transfer area to reaction volume is preferable within the range from 30 to 7000, particularly preferably from 200 to 2000, $m^2/m^3$.

In the process of the invention the temperature difference between the temperature controlled medium and the reaction medium can be held in particular at less than 20° C., particularly preferably at less than 10° C., very particularly preferably at less than 5° C.

The temperature increase in the reaction mass in the longitudinal direction, ie. in the flow direction, in the case of the customarily exothermic polymerizations is preferably less than 10° C., in particular less than 5° C., particularly preferably less than 2° C.

To achieve substantially isothermal reaction control of the polymerization it is also important to consider the manner of addition of the monomers into the annular gap. They are preferably metered in via one or more nozzles attached in a circle to the reactor.

It is preferable to recycle some of the product to the reactor inlet, for example with the aid of a gear pump; one beneficial effect of this is to achieve very rapid heating up of the monomers through mixing with this recycled stream. Another beneficial effect is that the high flow rate in this recycle loop improves the isothermal character of the polymerization reaction, since this version of the reactor, in contradistinction to a tubular reactor without recycling, has a distinctly lower gradient in the monomer or polymer concentration. The capacity of the recycle line and of the pump should together not exceed from 5 to 10% of the reactor capacity in order that the reaction may be substantially confined to the reaction space within the annular gap.

Product recycling is particularly advantageous in the case of annular gap reactors with a gap width of from 1.5 to 10 mm or from. 3.0 to 10 mm and equipped with a temperature controllable jacket and a temperature controllable rotor.

It is advantageous to return the polymer-containing recyclate into the reactor by way of the outer compartment of a slender double tube; the monomers are metered in through the inner compartment of this double tube; by employing a very small diameter for the inner tube the monomers and the initiator warm up only slightly before entry into the annular gap.

The recycle ratio, ie. the ratio of recyclate to throughput through the annular gap reactor, is preferably from 2:1 to 35:1, particularly preferably from 10:1 to 30:1, very particularly preferably from 20:1 to 30:1.

It is also possible, in principle, to connect two or more of the reactors of the process of the invention in series or else in a loop. If one of the reactors is to be operated with partial recycling of the mass flow, it is preferable for the first reactor, or the reactor into which the monomers are to be metered, to be equipped with the product recycling means described. Since the heat to be removed peaks in the first part of the reaction, it is advantageous to make the conversion in the first of a series of reactors <50%.

The polymerization process of the invention is carried out at from 110° to 270° C. If free radical initiators are present the preferred temperature range extends from 110° to 240° C., particularly preferably from 120° to 230° C. Any deviation from the chosen polymerization temperature is preferably below ±5° C., in particular below ±2° C.

Especially the range from 150° to 270° C. produces products with a narrow molecular weight distribution (polydispersity values $M_w/M_n<3.5$, in particular <2.5 and very particularly preferably <2.0) and particularly low molecular weights ($M_n$ from 1000 to 10,000).

Of particular preference for preparing such products having a narrow molecular weight distribution is a temperature range of from 160° to 240° C., especially from 170° to 230° C.

The residence time depends on the chosen temperature.

To prepare vinyl polymers having a molecular weight within the range from 1000 to 20,000 the residence time at from 110° to 150° C. is preferably from 3 to 10, particularly preferably from 3 to 8, minutes. From above 75° C. to 270° C. the residence time is preferably from 1 to 10, particularly preferably from 1 to 5, minutes.

In the process of the invention the conversions can be varied within relatively wide limits, for example within the range from 40 to 95%. Owing to its high space-time yields, the process of the invention is economical even at comparatively low conversions. In general, however, the process is parameters will be chosen so as to maximize the conversion; to obtain products having a very narrow molecular weight distribution, however, it can be advantageous to minimize the conversion.

The reactor pressure setting depends on the monomer used, on the Solvent used, on the temperature and on the conversion obtained under steady state conditions in the reactor. In general, the polymerization process of the invention is carried out at from 3 to 30 bar, preferably at from 5 to 20 bar.

After the polymerization has ended, it is customary to remove unconverted (reusable) monomer, the by-products, any initiator decomposition products and, if used in the first place, the reusable solvent.

This may be done for example using a continuous thin film evaporator connected in series.

In the presence of sparingly volatile monomers, for example hydroxyalkyl (meth)acrylates or long chain alkyl acrylates, the combination of the process of the invention with the evaporation step results in particularly low residual monomer contents, compared with those customary in the stream addition/kettle polymerization process. When high evaporator temperatures, in particular above 190° C, become necessary, as is the case for example with products having high glass transition temperatures, the combination of the process of the invention with a subsequent evaporation of the volatile constituents in a thin film evaporator is particularly advantageous.

Removed monomer and solvent can be recycled into the process, if necessary after removal of by-products such as initiator decomposition products and oligomers in a separate operation.

Suitable vinyl monomers for the process of the invention have various chemical structures. The process is particularly suitable for acrylic compounds, since these compounds, owing to their particularly exothermic polymerization, make it very difficult to achieve isothermal conditions.

Preference is therefore given to using monomer mixtures containing from 60 to 100% by weight, particularly preferably from 80 to 100% by weight, of acrylic monomers.

Suitable acrylic monomers are for example (meth)acrylic acid, $C_1$–$C_8$-alkyl (meth)acrylates, (meth)acrylonitrile and (meth)acrylamide.

Specific examples are:

methyl (meth)acrylate, ethyl (meth)acrylate, n-propyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-hydroxyethyl (meth)acrylate, 2-hydroxypropyl (meth)acrylate, butanediol mono(meth)acrylate, N, N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-benzoxyethyl (meth)acrylate, 2-chloroethyl (meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, allyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenethyl (meth)acrylate, phenyl (meth)acrylate, propargyl (meth)acrylate, tetrahydrofurfuryl (meth) acrylate, tetrahydropyranyl (meth)acrylate and also (meth)acrylic acid and salts thereof, (meth)acrylamide, (meth)acrylonitrile, N-methyl(meth)acrylamide, N-ethyl(meth)acrylamide, N,N-dimethyl(meth)acrylamide, N,N-diethyl(meth)acrylamide, N-phenyl(meth)acrylamide, (meth)acrolein, cyclopentadienyl (meth)acrylate, isopropylideneglyceryl (meth)acrylate, oxazolidinylethyl (meth)acrylate, butoxymethyl(meth)acrylamide, isobutoxymethyl(meth)acrylamide, methyl α-chloroacrylate, methyl 2-cyanoacrylate, N,N-dimethylacrylamide and N,N-diethylacrylamide.

In addition to the acrylic monomers mentioned it is advantageous or desirable for many applications, for example in paint chemistry, for acrylic monomers with hydroxyl groups and/or epoxy groups to be present in the copolymer in order that it may be crosslinkable. Suitable examples are $C_1$–$C_8$-hydroxyalkyl (meth)acrylates, such as 2-hydroxyethyl (meth)acrylate, 2-hydroxypropyl (meth)acrylate, 2-hydroxyblatyl (meth)acrylate, n-hydroxybutyl (meth)acrylate and glycidyl (meth)acrylate.

In addition to acrylic monomers the process of the invention is especially important for aromatic vinyl monomers such as, α-methylstyrene, t-butylstyrene, o-chlorostyrene or in particular styrene. They can be used not only alone but also mixed, especially with the abovementioned acrylic monomers.

Further vinyl monomers for use in the process of the invention are for example vinyl esters of carboxylic acids of from 1 to 20 carbon atoms, such as vinyl propionate or vinyl acetate, vinyl halides, such as vinyl chloride, nonaromatic hydrocarbons having from 2 to 8 carbon atoms and at Least two olefinic double bonds such as butadiene or isoprene, vinyl ethers, for example of aliphatic $C_1$–$C_{10}$-alcohols, such as vinyl isobutyl ether, heterocyclic vinyl compounds such as vinylpyrrolidone or vinylpyridine, unsaturated carboxylic acids, such as crotonic acid or maleic acid, or salts and derivatives thereof.

The process is particularly suitable for preparing functional polymers that are crosslinkable with or without the use of an outside crosslinking agent. Functional groups suitable for crosslinking reactions are for example carboxyl, ketone or aldehyde, amino and in particular hydroxyl and epoxy groups.

Crosslinkabe polymers can contain in general from 0.5 to 60, in particular from 1 to 40, particularly preferably from 2 to 30, % by weight of monomers having such functional groups. These monomers can be not only acrylic monomers but also other monomers.

The polymerization can be carried out in the presence of an initiator or by purely thermal initiation. The initiator can b e added for example separately or mixed with the monomers. It is preferable to dissolve the initiator in a suitable solvent or in the monomers.

The initiators are in general used in a molar ratio, based on the monomers, of from 0.0005:1 to 0.1:1, preferably from 0.00:1 to 0.05:1.

Suitable initiators are for example peroxidic compounds and azo compounds, and the decomposition temperature is suitably adapted to the desired polymerization temperature (a high polymerization temperature corresponds to a high decomposition temperature, and vice versa). If desired, the initiators may also be used in the form of a mixture.

Specific examples are di-t-butyl peroxide, dibenzoyl peroxide and 2-phenylazo-2,4-dimethyl-4-methoxyvaleronitrile as initiators for high polymerization temperatures and dioctanoyl peroxide as initiator having a low decomposition temperature.

If acrylic monomers are predominant, the polymerization is preferably carried out in the presence of an initiator. Purely thermally initiated polymerization is preferably applied to monomer mixtures consisting predominantly of aromatic vinyl monomers, in particular styrene or α-methylstyrene.

The presence of free radical polymerization initiators can be advantageous with regard to the polymerization temperature, the resulting molecular weight distribution and also, for example, the color of the products.

It is also possible to use for example regulators and solvents. Solvents are preferably used, if desired, in amounts of from 0 to 40% by weight, in particular from 0 to 25% by weight, based on the monomers. At high polymerization temperatures (>150° C.) it is preferable to use regulating solvents, ie. solvents which are incorporated into the polymers as terminal groups. The amounts to be employed depend for example on the nature of the monomers, on the transfer constant and on the desired polymerization viscosities.

At low conversions it is also possible for unconverted monomers to act as solvent.

Examples of suitable solvents are alcohols or ethers such as ethylglycol ether, ethyldiglycol ether, ethylene glycol dimethyl ether, diethylene glycol dimethyl ether, triethylene glycol dimethyl ether, esters such as butyl acetate, ketones such as methyl amyl ketone, aromatic alcohols such as benzyl alcohol, methylbenzyl alcohol, cumene alcohols and alkylaromatics such as toluene, xylene, ethylbenzene, cumene, diisopropylbenzene, diphenylmethane, tetralin or decalin.

The products produced by the process of the invention are useful for example as binders for gloss and protective paints, printing inks or paper coatings.

EXAMPLE

The reactor used was an externally temperature controlled annular gap reactor having a gap width of 2 mm and a capacity (in the reaction space) of 700 ml, fitted with a rotor (diameter 96 mm) with webs (height 1.7 mm, length 90 mm) for promoting mixing, a product recycling means and 4 temperature sensors distributed along the length of the reaction gap.

Metering of the mixture of monomers, solvent and catalyst and product recycling were effected with a double tube, through the inner tube of which the monomers were metered and through the outer tube of which the product stream was recycled, so that the monomer mixture to be metered was surrounded by a ring of recycled polymerization solution. The inlet temperature sensor was situated very close to the point of monomer feed into the reaction gap.

The following monomer mixtures a and b were polymerized at a rotor speed of 300 rpm (1.5 m/s):

a.
  42.5 parts of methyl methacrylate
  34.5 parts of hydroxyethyl acrylate
  14 parts of ethylhexyl acrylate
  9 parts of styrene
  0.5 part of acrylic acid b.

23 parts of methyl methacrylate 27 parts of hydroxyethyl acrylate 34.5 parts of n-butyl acrylate.

15 parts of styrene 0.5 part of acrylic acid

Parts are by weight.

The polymerization was carried out with 20% by weight of ethyldiglycol as solvent and 1.93% by weight of di-tert-butyl peroxide as initiator, each percentage being based on the monomer mixture.

The polymerization was started in each case with a reactor filled with solvent and set to the desired temperature. The polymerization was terminated as appropriate by metering in solvent.

The average residence time in the reactor was from 3 to 4 minutes. To work up the product mix the reaction part was fitted on the downstream side with a thin film evaporator, which was operated at about 170° C. under a vacuum of 1 mm.

The product is had without exception an iodine color number of from 0 to 1. If necessary, small amounts of gel particles were separated off by dissolving the products in xylene and filtering the solution.

The weight average molecular weight $M_w$ and the number average molecular weight $M_n$ were determined by gel permeation chromatography (GPC) using polystyrene as standard.

The method is described for example in Analytiker Taschenbuch vol. 4, pages 433 to 442 (Berlin 1984).

The process and material data are listed in Tables 1 and 2.

TABLE 1

| | | Monomer mixture a | | | | |
|---|---|---|---|---|---|---|
| | | Runs | | | | |
| | | a1 | a2 | a3 | a4 | a5 |
| Inlet temperature T1 | °C. | 197 | 202 | 189 | 189 | 210 |
| Intermediate temperature T2 | °C. | 218 | 217 | 200 | 200 | 218 |
| Intermediate temperature T3 | °C. | 218 | 216 | 199 | 199 | 218 |
| Outlet temperature T4 | °C. | 216 | 215 | 198 | 198 | 214 |
| Shell temperature | °C. | 218 | 216 | 200 | 200 | 198 |
| Pressure | bar | 5 | 5 | 4 | 5 | 4.5 |
| Throughput (T) | kg/h | 9.6 | 4.78 | 9.75 | 13.5 | 5.3 |
| Recycle rate (R) | l/h | 167 | 127 | 115 | 166 | 165 |
| Recycling ratio (R/T) | | 17.4 | 26.6 | 11.8 | 12.3 | 31 |
| Conversion (double determination) | % | 87/93 | 91/95 | 66/73 | 66/72 | 88/84 |
| Weight average molecular weight $M_w$ | $M_w$ | 3800 | 3890 | 5500 | 5900 | 3900 |
| Number average molecular weight $M_n$ | $M_n$ | 1800 | 1910 | 2400 | 2500 | 1800 |
| $M_w/M_n$ | | 2.10 | 2.04 | 2.30 | 2.36 | 2.1 |

TABLE 2

| | | Monomer mixture b | | | | |
|---|---|---|---|---|---|---|
| | | Runs | | | | |
| | | b1 | b2 | b3 | b4 | b5 |
| Inlet temperature T1 | °C. | — | 211 | 199 | 189 | 192 |
| Intermediate temperature T2 | °C. | 200 | 218 | 199 | 199 | 199 |
| Intermediate temperature T3 | °C. | 200 | 219 | 199 | 199 | 199 |
| Outlet temperature T4 | °C. | — | 217 | 200 | 198 | 197 |
| Shell temperature | °C. | 200 | 218 | 199 | 199 | 199 |
| Pressure | bar | — | 5 | 5 | 4 | 4 |
| Throughput (T) | kg/h | 9.5 | 9.5 | 13.7 | 9.4 | 5.5 |
| Recycle rate (R) | l/h | 167 | 167 | 175 | 166 | 166 |
| Recycling ratio (R/T) | | 18 | 18 | 13 | 18 | 30 |
| Conversion (double determination) | % | 87/92 | 96/95 | 86/92 | 84/90 | 89/— |
| Weight average molecular weight $M_w$ | $M_w$ | 6300 | 4700 | 6900 | 9900 | 7000 |
| Number average molecular weight $M_n$ | $M_n$ | 2600 | 2100 | 2800 | 3100 | 2800 |
| $M_w/M_n$ | | 2.4 | 2.2 | 2.5 | 3.2 | 2.5 |

We claim:

1. A process for the continuous polymerization of vinyl monomers to form vinyl polymers, which comprises:

(a) carrying out free radical initiated or thermally initiated polymerization within an annular gap reactor wherein said annular gap reactor comprises an outer tube and a cylindrical rotor inserted Within said outer tube to form an annular gap between said rotor and said outer tube of from 0.5 to 10 mm in width, giving a residence period of from 1 to 10 minutes, wherein said outer tube is temperature controlled, and (b) carrying out the polymerization at from 150° to 270° C. to provide a vinyl polymer having a molecular weight Mn of from 1000 to 20,000 and a polydispersity value Mw/Mn<3.5.

2. A process as claimed in claim 1, wherein some of the stream through the annular gap is recycled, the ratio of recyclate to throughput through the annular gap being from 2:1 to 35:1.

3. A process is claimed in claim 1, wherein the rotor has a circumferential speed of from 0.5 to 2 m/s.

4. A process as claimed in claim 1, wherein the rotor has mixer attachments.

5. A process as claimed in claim 1, wherein the polymerization is carried out in the presence of up to 40% by weight, based on the monomers used, of a solvent.

6. A process as claimed in claim 1, wherein the monomer mixture to be polymerized is from 60 to 100% by weight (meth)acrylic ester.

7. A process as claimed in claim 1, wherein a polymerization initiator is used in a molar ratio to monomer of from 0.0805:1 to 0.1:1.

8. A process as claimed in claim 1, wherein the width of the annular gap is from 0.5 to 7.0 mm.

9. A process as claimed in claim 1, wherein the ratio of heat transfer area to reaction volume is in the range from 30 to 7000 $m_2/m^3$.

10. A process as claimed in claim 1, wherein the ratio of heat transfer area to reaction volume is in the range from 200 to 2000 $m_2/m^3$.

11. The process according to claim 1, wherein the polymerization is free radical initiated.

12. The process according to claim 1, wherein the polymerization is thermally initiated.

13. The process according to claim 11, wherein the polymerization is free radical initiated by peroxidic compounds or azo compounds.

14. The process according to claim 1, wherein the polymerization consists of the polymerization of vinyl polymers selected from acrylic monomers and aromatic monomers.

15. The process according to claim 1, wherein Mn is from 1,000 to 10,000.

16. The process according to claim 1, wherein the process has a residence time of from 3 to 10 minutes.

17. The process according to claim 1, wherein the process has a residence time of from 3 to 8 minutes.

18. The process according to claim 1, wherein the process has a residence time of from 1 to 5 minutes.

* * * * *